Figure 1:
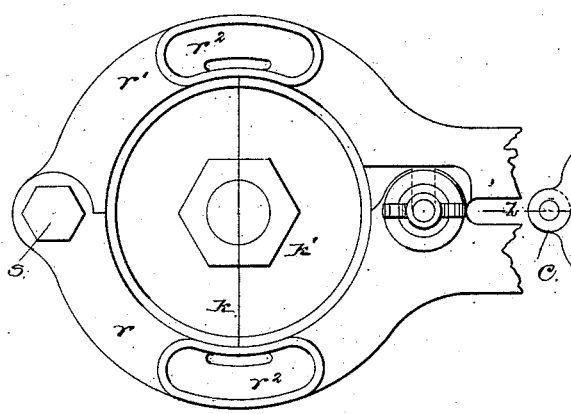

(No Model.)

J. T. COPITHORN.
MOLD.

No. 293,953. Patented Feb. 19, 1884.

Witnesses.
W. H. Sigston
John F. C. Reinhart

Inventor.
John T. Copithorn
by Crosby & Gregory attys

UNITED STATES PATENT OFFICE.

JOHN T. COPITHORN, OF BOSTON, MASSACHUSETTS, ASSIGNOR OF ONE-HALF TO EDWARD H. STUDLEY, OF SAME PLACE.

MOLD.

SPECIFICATION forming part of Letters Patent No. 293,953, dated February 19, 1884.

Application filed November 1, 1883. (No model.)

*To all whom it may concern:*

Be it known that I, JOHN T. COPITHORN, of Boston, county of Suffolk, State of Massachusetts, have invented an Improvement in Molds, of which the following description, in connection with the accompanying drawings, is a specification, like letters on the drawings representing like parts.

My invention, relating to the manufacture of drum-traps for plumbing purposes, is embodied in an apparatus for producing them.

Drum-traps consisting of a cylindrical chamber composed, mainly, of lead, provided with a threaded neck of brass or metal harder than lead, to be closed by a threaded cap or nut, have usually been made by hand from a piece of lead pipe or tubing forming the sides of the cylindrical chamber, a piece of sheet-lead united by solder with the said tubing at one end, to form the bottom of the trap or chamber, and the threaded neck united with the other end of the cylinder by a wiped solder-joint, the traps thus made being very expensive, as a considerable amount of skilled labor is required for their production. The solder-joints at the bottom and top of the trap are, moreover, liable to be eaten away by acids and gases to which the trap is exposed, and which do not have an equally detrimental effect upon the lead body.

The present invention has for its object to produce a drum-trap the body of which is composed wholly of a single homogeneous casting of lead or of other suitable material, having united with it in the process of casting the previously-threaded neck of brass or harder material which is to receive the threaded cap of the trap.

The invention consists in a novel mold for casting the trap, the said mold being made in two portions—one to shape the interior of the trap or forming a core over which it is cast, and the other to shape the exterior portion of the trap and constituting the mold proper. As the trap is contracted at its neck or the opening at its top is smaller in area than the interior of the trap, it would be impossible to remove the core, if made of a single piece, otherwise than by breaking up and destroying the core. The mold and core are both made of a metal which will withstand the temperature of melted lead—such, for instance, as brass, and each are made of separable portions, to enable them to be removed from the cast trap. The internal portion of the mold or core when put together forms a hollow chamber similar in form to the finished trap, and has an independent removable bottom piece, while its side portions are divided into several parts, which can be drawn together or knocked down and removed separately from the interior of the finished trap. The outer mold is divided longitudinally or made in two parts, which are hinged together, and a core-holding device is employed by which the core portion, when put together, is sustained in proper central position in the outer mold. The core portion receives upon it the ring which is to form the neck of the trap and upon which the molten lead is poured, uniting with it so as to form, practically, a single piece.

Figure 2:
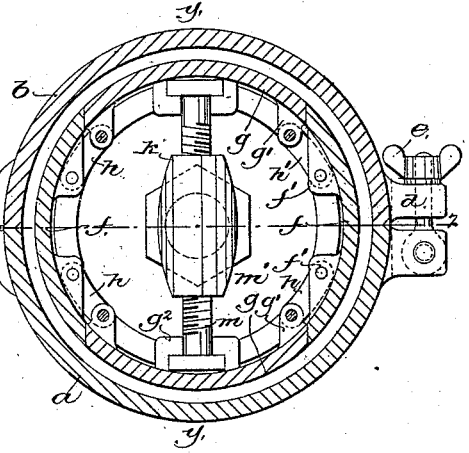
Figure 3:
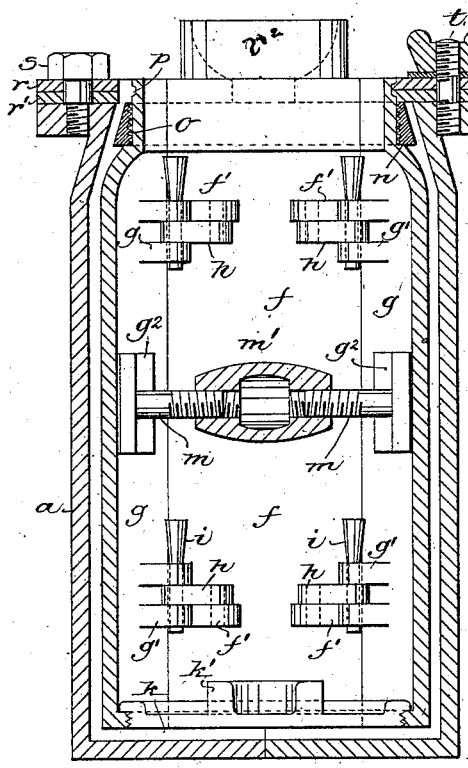
Figure 4:
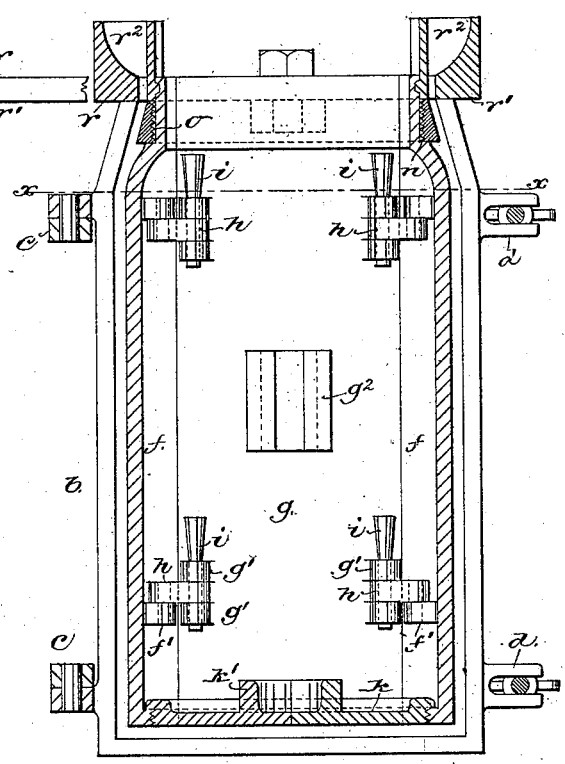

Figure 1 is a plan view of the core-holding device and core portion of the mold when put together ready to be placed in the outer mold; Fig. 2, a horizontal section of the complete mold and core in proper position to receive the molten metal, taken on line $x\,x$, Fig. 4; Figs. 3 and 4, vertical sections on line $y\,y$ and $z\,z$ of Fig. 2, respectively.

The outer mold, in which the improved trap is cast, is composed of two parts, $a\,b$, hinged together at $c$, and provided with lugs $d$, by which they may be fastened tightly together by suitable clamping devices, $e$, shown in this instance as consisting of bolts pivoted in the lugs of the portion $a$ and thumb-nuts, the said bolts adapted to engage the lugs of the portion $b$. The two parts $a\,b$, when thus fastened together, form a chamber mainly cylindrical in shape, but having a contracted or tapering neck, the interior of the said chamber being of the shape desired for the exterior of the trap. The internal portion or core is composed of a mainly cylindrical body, the sides of which are shown in this instance as divided into four parts, $f\,f\,g\,g$, the latter being adapted to slide radially between the former, as will be best understood by referring to Fig. 2. The side pieces, $f\,f\,g\,g$, of the case are provided with internal ears or lugs, $f'\,g'$, adapted to be connected by links $h$, fastened therein by removable pins $i$, by which the said parts $ff$ and $gg$ are fastened together, with their outer surface in proper position to shape the interior of the trap. The lower ends of the side pieces, $ffgg$, when thus fastened together, have an opening (shown as circular in shape and screw-threaded) to receive the bottom or end piece, $k$, made in two parts, so as to enable it to pass below the lugs $f'g'$ after the side pieces are fastened together. The two parts of the bottom piece, $k$, when dropped to the lower end of the side piece, will be placed together side by side, forming a nut which will be turned into the opening at the lower end of the parts $ffgg$, thus forming the bottom of the core. The said nut has a raised center, $k'$, provided with wrench-faces, to enable it to be turned tightly to place by a socket-wrench and to overcome the adhesion between it and the metal cast around it when the core is to be removed. The side pieces $g$ of the core are provided with sockets $g^2$, to receive the heads of bolts $m$, engaged by a right and left threaded nut, $m'$, by which the adhesion of the cast metal may be overcome in drawing the parts $g$ of the core together, the said bolts and nut being shown in operative position in Figs. 2 and 3, which also shows the nut $k$, although in practice the said bolts and nut $m$ and $m'$ would not be used until after the nut $k$ was removed. The upper portion of the core $ffgg$ is contracted, as shown, and provided with a shoulder, $n$, which receives the threaded ring $o$, that is to form the interior of the neck of the trap, the said ring having its outer surface prepared for the molten metal to unite properly with it when in place on the shoulder $n$. The neck of the core is provided with a groove, $p$, which receives a corresponding projecting rib on the core-supporting device $rr'$, consisting of two jaw-like portions pivoted at 3 upon the portion $a$ of the outer mold, and adapted to be fastened together by a fastening device, $t$, shown as a stud and thumb-nut fixed upon the other portion, $b$, of the outer mold. The jaws $rr'$, when fastened together, engage the neck of the core and sustain it in proper position in the mold $ab$, thus leaving a space between the said core and mold, into which the molten metal is poured, one or both of the jaws being provided with pouring-cups $r^2$, and the said jaws constituting the top of the mold.

In operation the core and mold are fastened together, as shown in the drawings, with the ring $o$ resting on the neck of the core, and the molten metal that is to form the trap is poured through one of the cups $r^2$ into the space between the said core and mold, after which the mold may be opened and the core removed by first unscrewing the nut $k$, then unfastening the links $h$, drawing the side pieces $g$ together, and removing them through the neck of the trap, and then removing the sides piece $f$, when the mold is again ready to be put together and another trap made. The opening of the jaws $rr'$ will cut off the surplus metal, making a smooth finish at the upper edge of the trap, which needs no subsequent manipulation.

The material commonly used for traps is lead; but it is obvious that any metal or alloy having the desired properties may be used as its equivalent, it being fusible at a comparatively low temperature, and easily cut and united with solder, as is necessary, for connecting the pipes therewith.

I claim—

1. The outer mold and the separable core, consisting of independent side pieces and means to fasten them together, they having, when thus fastened, an opening at their ends, combined with the removable bottom piece made in separable parts for closing the said opening, substantially as described.

2. A separable core composed of side pieces, $ff$ and $gg$, the latter capable of being drawn together or contracted, and thereby disengaged from the former, combined with fastening-links $h$, for holding the said part together in expanded position, and the independent threaded bottom or end piece, adapted to screw in a threaded opening at the end of the side pieces when fastened together, substantially as described.

3. A separable core composed of side pieces, $ff$ and $gg$, the latter provided with sockets $g^2$, combined with the bolts $m$ and nut $m'$, whereby the side pieces $gg$ are withdrawn from the others, thus separating the core and permitting its parts to be removed from the casting, substantially as described.

4. The outer mold and the separable core, provided with a shoulder to receive the ring $o$, combined with the core-suspending device mounted in the outer mold, substantially as described.

5. The core and the separable outer mold, combined with the core-supporting device $rr'$, hinged upon the outer mold, and adapted to engage and hold the core, the core-supporting device being provided with a pouring-cup and passage, substantially as described.

In testimony whereof I have signed my name to this specification in the presence of two subscribing witnesses.

JOHN T. COPITHORN.

Witnesses:
 JOSEPH P. LIVERMORE,
 BERNICE J. NOYES.